United States Patent [19]

Melnik

[11] Patent Number: 5,737,318

[45] Date of Patent: Apr. 7, 1998

[54] METHOD FOR INITIALIZING A WIRELESS, PACKET-HOPPING NETWORK

[75] Inventor: George A. Melnik, Montrose, N.Y.

[73] Assignee: Philips Electronics North America Corporation, New York, N.Y.

[21] Appl. No.: 579,650

[22] Filed: Dec. 27, 1995

[51] Int. Cl.⁶ .................................................. H04Q 7/20
[52] U.S. Cl. ........................... 370/254; 395/200.02
[58] Field of Search ........................... 370/254, 255, 370/256, 910, 913; 395/200.02, 200.1

[56] References Cited

U.S. PATENT DOCUMENTS

| | | | |
|---|---|---|---|
| 4,864,563 | 9/1989 | Pavey | 370/254 |
| 5,381,403 | 1/1995 | Maher | 370/254 |
| 5,453,978 | 9/1995 | Sethu | 370/60 |

*Primary Examiner*—Douglas W. Olms
*Assistant Examiner*—Matthew C. Phillips
*Attorney, Agent, or Firm*—Edward Blocker

[57] ABSTRACT

A method for automatically initializing a wireless, packet-hopping network, such as a building system control network which is used to control the operation of a building system, such as a lighting, security, and/or HVAC system. In accordance with this initialization method, each node in the network first determines its entire connectivity, i.e., its connectivity to every other node in the network within a prescribed range thereof, and then routes this connectivity information to the building computer. This connectivity information is transmitted in a packet or set of packets that are routed to the building computer, thus minimizing the volume of traffic that the building computer and the nodes nearest thereto must handle, and thus, significantly reducing the probability of collisions of the connectivity information packets. This connectivity information is transmitted using a "software handshaking" technique to ensure that all of the connectivity information is received by the building computer. According to this software handshaking scheme, a packet which includes a byte having a special command value informs the building computer as to how many packets of connectivity information for that particular node remain to be received before all of the connectivity information for that node has been transferred to the building computer.

25 Claims, 2 Drawing Sheets

METHOD FOR INITIALIZING A WIRELESS, PACKET-HOPPING NETWORK

BACKGROUND OF THE INVENTION

The present invention relates generally to wireless, packet-hopping networks, and more particularly, to a method for initializing such a network.

A network of nodes which communicate with each other and with a central node via wireless (RF) links are generally referred to as wireless networks. In such wireless networks, each node includes a digital signal processing device and an RF transceiver which has a prescribed transmitting range. Data is typically communicated (transferred) between the individual nodes and the central node by a technique known as "packet hopping", in which individual packets of data are transferred from the central node to a destination node and from an origin node to the central node by being hopped from node-to-node along a route which is determined in accordance with the prescribed communication protocol for the network.

"Packets" are logical units of data typically ranging in size from about 5–1000 bytes. Generally, these packet-hopping data communications are under the control of the central node, which is usually a computer on which resides the data communications control software. The packet-hopping data transfer scheme enables a reduction in the cost of the RF transceivers and compliance with FCC Part 15 requirements. Each packet of data contains the address of the node from which it originated or is destined. The address of each node is established when the network is originally installed.

Such wireless, packet-hopping networks are particularly suitable for controlling one or more functions or systems of a building, e.g., the lighting, HVAC, and/or security systems of the building, because it offers a low-cost, indoor topology that does not require new lines to be added to the existing structure in order to carry the network information. Further, such networks could support additional systems installed in the building, such as paging and personal communications systems.

The central node of such building control networks is typically a programmable central controller or building computer on which resides the system control software. The individual nodes are typically distributed throughout the building to monitor the status/value of prescribed parameters of the building system being controlled, and to produce control signals in response to commands issued by the building computer to adjust such parameters as required. It is important that the building computer be able to send and receive data to and from each node in the network in order to properly monitor the status/value of such prescribed parameters, and to issue commands to adjust such parameters as required, in accordance with the system control software.

An exemplary building control network is an automatic or intelligent lighting control system which monitors lighting levels, occupancy status, energy consumption as a function of time, and/or other lighting parameters of each room and/or area of the building within the network, i.e., each room and/or area of the building which is equipped with a lighting module(s) linked to an RF transceiver which constitutes a node in the network under the control/management of the building computer.

In such an intelligent lighting control system, each node in the network includes one or more sensors (e.g., occupancy status, daylight (ambient lighting), and dimming/lighting level sensors) which provide sensor feedback signals to the building computer, which analyzes such sensor feedback signals in accordance with the lighting system control software, and sends control signals (commands) to the individual nodes, as required, in order to adjust the lighting levels of the monitored rooms/areas of the building in accordance with the lighting system control software, e.g., to optimize the energy efficiency of the lighting system. Thus, rather than operating independently of one another, the distributed modules are functionally integrated into a single building-wide network under the control of the building computer.

The installation of a wireless, packet-hopping network entails the physical placement and powering of each node in the network. The address of each node in the network can either be programmed into the node at installation or, if preprogrammed, logged into the memory of the central node (building computer), along with the physical location of each node in the network. After the network is installed, it must be initialized in order to provide the building computer with nodal connectivity information which the network communications protocol requires in order to route packets of data through the network by the above-described packet-hopping technique. The nodal connectivity information includes information as to which nodes in the network are able to communicate with each other. The building computer formulates routing tables on the basis of the nodal connectivity information which it gathers during the network initialization process. The building computer then uses these routing tables to transfer packets of data from the building computer to a destination node and from an origin node to the building computer by hopping the packets from node-to-node along a route which it determines from the routing tables to be the most efficient route available at that time.

As will be fully developed hereinafter, presently utilized network initialization schemes suffer from a number of problems, foremost of which are unresolvable collisions of packets of connectivity information returning to the building computer and unawareness of loss of packet data due to these collisions or poor connectivity. These problems are exacerbated by virtue of the fact that such schemes do not adequately take into account such factors as interference and sporadic connectivity which are intrinsic to RF communications systems.

Additionally, the presently utilized network initialization schemes do not ensure that a two-way link exists between nodes which are regarded as connected, do not obtain statistical information about the quality of the link between nodes which are regarded as connected, and do not transfer routing information to each of the nodes, but rather, just determine the nodal connectivity.

As a result of these drawbacks and shortcomings, the nodal connectivity which is obtained during the network initialization process is incomplete. Consequently, the routing tables which are formulated by the building computer are incomplete and unreliable, thereby resulting in inefficient routing of data packets, unawareness of loss of packet data, and other data communications faults. Moreover, the presently available network initialization schemes are complex and costly to implement, since the network provider must generally perform the initialization procedure or, at a minimum, provide costly expert assistance to the network manager.

The most prevalent network initialization method which is utilized in wireless, packet-hopping building control networks is the random initialization method. This method is initiated by originating a random initialization packet from the main/central node (building computer). Once transmitted, this packet is randomly relayed throughout the network. This initialization packet contains initialization information that must be retransmitted by every node which receives it until all nodes have received it. This initialization packet also prompts each receiving node to transmit an initialization response packet back to the building computer. The initialization response packet contains associated connectivity data. A node which receives the random initialization packet for the first time reads the address of the sending node and considers this node as its "parent node", and first returns an intialization response packet to its parent node, which returns it to its parent node, and so on, until the initialization response packet returns to the building computer. This "return packet" contains connectivity information which indicates that the connection of the node which originally transmitted this return packet to its parent node has been made. This node then transmits the random initialization packet, first replacing the address of the sending node with its own address. The route for returning packets to the building computer is now set, and is based simply on which node transmits its initialization packet first, and not on the quality of the connection. If additional initialization packets are received at this node, it will forward the generated connectivity information to the building computer via its previously determined parent node, without verifying two-way communication with the node transmitting the initialization packet.

During an initialization process using this scheme, an extremely high concentration of traffic in the vicinity of the building computer is generated, as a consequence of the fact that each and every connection is represented by a single packet which must be received by the building computer. Thus, if 10 nodes in a network transmit an initialization packet at nearly the same time and each of these ten initialization packets are received by 6–10 other nodes, then a total of 60–100 initialization response packets would be transmitted to the building computer at nearly the same time. If the building computer is also able to communicate with 6–10 other nodes, each of these nodes in the vicinity of the building computer would have to handle 6–10 returning initialization response packets for transmission to the building computer. Since only one node can communicate with the building computer at any given time, the remaining 5–9 nodes would have to hold their packet (in a packet buffer) and would likely miss subsequent returning initialization response packets. This could occur for two reasons. First, packet buffers in nodes holding packets for retransmission to the building computer would overflow as more packets are received. Second, nodes which are not connected and thus unable to communicate with (or "hear") each other, could simultaneously transmit, thereby causing packets to be lost.

The second situation is generally referred to as "unresolvable collision" of the packets. As might be expected, the probability of such unresolvable collisions increases dramatically with traffic volume. With reference now to FIG. 1, an example of such an unresolvable collision will now be described. In the illustrated example, if node 2 holds a packet received from node 6 while node 1 is transmitting a packet received from node 3 back to the building computer (BC), a packet being transmitted from node 5 to node 2 may be lost. The reason for this unresolvable collision is that node 5, because it is outside of the range of the RF transmitter of node 1 and thus is unaware of (i.e., unable to "hear") the transmission from node 1 to the building computer, attempts to transmit a packet to node 2, which is waiting for the transmission from node 1 to the building computer to be completed. It is not necessary that there be a pending transmission from node 2 to the building computer for such a collision to occur. In a single buffered system, even if node 5 could complete its communication with node 2, the packet would still be lost due to buffer overflow.

As mentioned, the random initialization method also lacks two-way link verification for each pair of nodes which it regards as being connected. More particularly, any node which receives an initialization packet from a node other than its parent node, will still route connectivity information through its parent node. Although this is not as significant a problem as unresolvable collisions, it can still cause network difficulties. For example, with reference again to FIG. 1, node 4, having received its first initialization packet from node 1, will also route the initialization response packet it receives from node 2 through node 1, because node 1 is its parent node. Thus, the connectivity of node 2→4 is solely defined by the packet transmitted from node 2 to node 4.

If connectivity probabilities are taken into consideration, another potential problem can be recognized. For example, if the nodal link 4→1 has a 70% probability of success, and the nodal link 4→2 has a 95% probability of success, then the initialization response packet transmitted by node 4 in response to the initialization packet it receives from node 2, may actually be lost during the transmission of the initialization response packet from node 4 to node 1. Even though the nodal link 4→2 is superior to the nodal link 4→1, the building computer will nevertheless enter the nodal link 4→1 in the muting table according to the random initialization method. Thus, it can be appreciated that the decision by the building computer to enter the nodal link 4→1 into the routing table is a consequence of the fact that this decision is based upon incomplete nodal connectivity information.

Based on the above and foregoing it can be appreciated that there presently exists a need in the art for a method for initializing a wireless, packet-hopping network which overcomes the above-discussed drawbacks and shortcomings of the presently available methods. The present invention fulfills this need in the art.

SUMMARY OF THE INVENTION

The present invention encompasses a method for initializing a wireless, packet-hopping network, such as a building system control network which is used to control the operation of a building system, such as a lighting, security, and/or HVAC system. In accordance with this initialization method, each node in the network first determines its entire connectivity, i.e., its connectivity to every other node in the network within a prescribed range or vicinity of that node, and then routes this connectivity information to the building computer. The "prescribed range or vicinity" from a given node is preferably every other node within its transmitting range that is able to receive uncorrupted information from the given node.

This connectivity information is transmitted in a packet or set of packets that are routed to the building computer, thus minimizing the volume of traffic that the building computer and the nodes nearest thereto must handle, and thus, significantly reducing the probability of collisions of connectivity information packets.

This connectivity information is transmitted using a "software handshaking" technique to ensure that all of the connectivity information is received by the building computer. According to this software handshaking scheme, a packet which includes a byte having a special command value informs the building computer as to how many packets of connectivity information for that particular node remain to be received before all of the connectivity information for that node has been transferred to the building computer.

This software handshaking scheme serves two purposes. First, it guarantees that all connectivity information is received by the building computer from all of the nodes, and it tests the routes defined by the previous initializations of the linking nodes closer to the building computer now being used to direct the returning packets of nodal connectivity information between the other initializing nodes and the building computer. Further, the building computer polls each node from which it does not receive the full nodal connectivity information after a prescribed period of time elapses without receiving this information. This method also allows for partial or incremental initialization of the network (e.g., one, two, or more nodes at a time), and also allows for re-initialization of any given node without involving the entire network.

Each individual node determines its connectivity by transmitting a series of beacon initialization packets requesting a response from all nodes which receive one or more of the beacon initialization packets. Each receiving node transmits a response beacon initialization packet which contains its address. The initializing node extracts the address of the receiving node from each response beacon initialization packet received from the other nodes and keeps a record of these receiving node addresses. The initializing node also counts the number of response beacon initialization packets received from each receiving node. This statistical information is valuable in the formulation of effective routing tables.

Since the intialization command issued by the building computer must be received by a specific node for that node to execute its initalization routine, the routing tables can be formulated, utilized, and tested by the building computer during the network initialization process. This results in a tested, functional network upon completion of the network initialization process. Preferably, nodes are registered as being connected only if a two-way link between the nodes is confirmed. For example, if one of a pair of nodes is outside of the transmitting range of the other node of the pair, then the nodes will not be registered as being connected.

Furthermore, the initialization method of the present invention can be used in addition to, or instead of, the random packet initialization method described hereinabove, as these methods are not mutually exclusive. For example, a random packet addressing method can be used for global addressing schemes in which the importance of the return information is not great and, as such, if the return information (or a portion(s)) thereof is lost, it can be subsequently obtained by individually querying the nonresponding nodes.

BRIEF DESCRIPTION OF THE DRAWINGS

These and various other features and advantages of the present invention will be readily understood with reference to the following detailed description taken in conjunction with the accompanying drawing, in which.

DETAILED DESCRIPTION OF THE INVENTION

Figure 1:
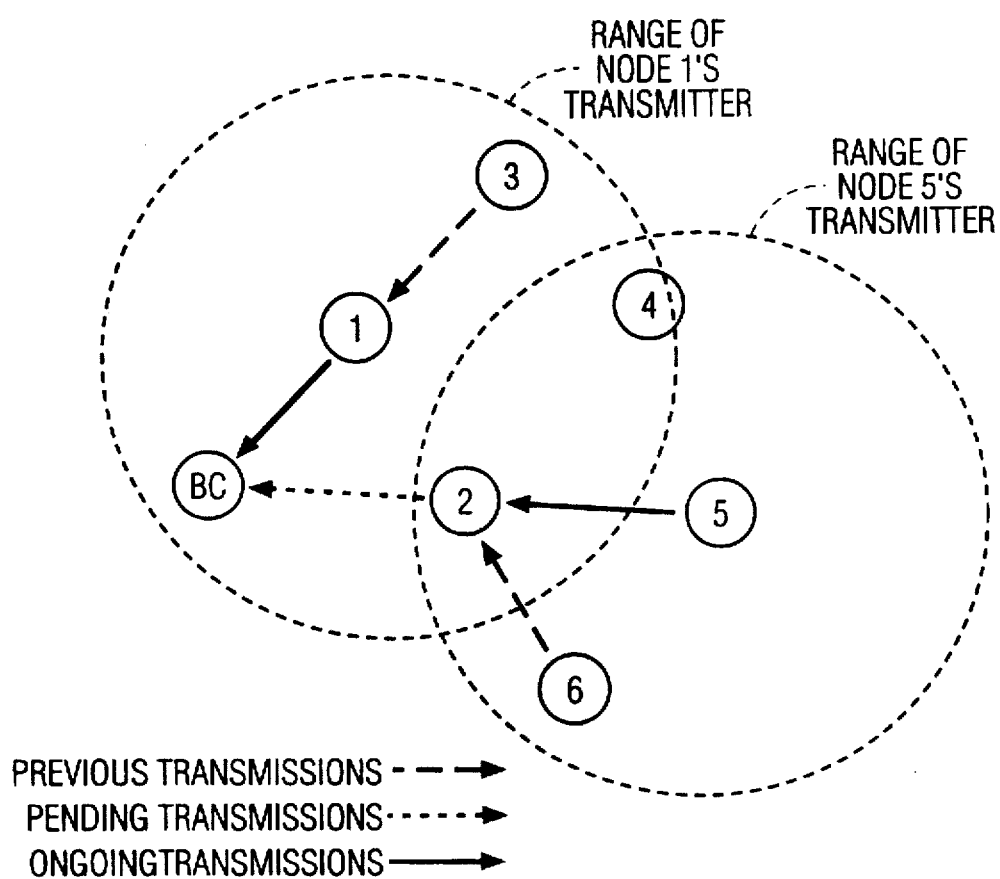
FIG. 1 is a diagram of a wireless, packet-hopping network illustrating the problem of unavoidable collisions of nodal connectivity information packets which occur when using a presently available random initialization scheme; and, FIG. 2 is a block diagram of a wireless, packet-hopping intelligent lighting control system with which the network initialization method of the the present invention may be utilized.

In overview, in accordance with the initialization method of the present invention, each node in a network first determines its entire connectivity, i.e., its connectivity to every other node in the network, and then routes this connectivity information to the building computer. This connectivity information is transmitted in a packet or set of packets that are routed to the building computer, thus minimizing the volume of traffic that the building computer and the nodes nearest thereto must handle, and thus, significantly reducing the probability of collisions of connectivity information packets.

Also, with the initialization method of the present invention, initialization can be requested at each node in the network at any time during network operation by a single command, without requiring full propagation of a random packet throughout the network, as in the presently available random initialization scheme.

Further, this connectivity information is transmitted using a "software handshaking" technique to ensure that all of the connectivity information is received by the building computer. According to this software handshaking scheme, a packet which includes a byte having a special command value informs the building computer as to how many packets of connectivity information for that particular node remain to be received before all of the connectivity information for that node has been transferred to the building computer.

Additional information such as the probability of success for particular routes can also be collected by the individual nodes for transmission back to the building computer to facilitate formulation of more effective routing tables. Further, since the intialization command issued by the building computer must be received by a specific node for that node to execute its initalization routine, the routing tables can be formulated, utilized, and tested by the building computer during the network initialization process. Preferably, nodes are registered as being connected only if a two-way link between the nodes is confirmed. For example, if one of a pair of nodes is outside of the transmitting range of the other node of the pair, then the nodes will not be registered as being connected.

The initialization method of the present invention can be used in addition to, or instead of, the random packet initialization method described hereinabove, as these methods are not mutually exclusive. For example, a random packet addressing method can be used for global addressing schemes in which the importance of the return information is not great and, as such, if the return information (or a portion(s)) thereof is lost, it can be subsequently obtained by individually querying the nonresponding nodes.

With the intialization method of the present invention, four different packet types are used. These packet types are defined as follows:

(1) INIT—this is a packet transmitted by the building computer to a node commanding the node to execute its intialization routine;

(2) RESPONSE_INIT—this is a packet or set of packets transmitted from an initialized node to the building computer which carries the complete connectivity information for that node;

(3) INIT_BEACON—this is a series of packets equally spaced in time transmitted by an initializing node requesting responses from all nodes which are within the transmitting range of that node (i.e., all nodes which can "hear" this transmission); and, (4) RESPONSE_INIT_BEACON—this is a packet transmitted by a node in response to an INIT_BEACON packet. This packet informs the initializing node which transmitted the INIT_BEACON packet of the identity (address) of the receiving (responding) node.

The initialization method of the present invention will now be described with respect to the illustrative wireless, packet-hopping network 10 depicted in FIG. 2 for the sake of simplicity and ease of illustration of the present invention. The network 10 consists of a plurality of nodes 12 and a building computer 14. Each of the nodes 12 includes an RF transceiver 16, a wall unit 18, and digital signal processing circuitry 20 (e.g., a microprocessor) which includes a memory (e.g., EEPROM and/or RAM) and one or more counters. The wall unit 18 may be of any convenient type well-known to those skilled in the art, e.g., a ballast control module for controlling the lighting level of a linked ballast 22, e.g., a dimmable fluorescent lamp. The wall unit 18 preferably includes one or more sensors (not shown), e.g., one or more occupancy status, daylight, and/or dimming/lighting level sensors) which provide feedback information for the digital signal processing circuitry 20, which processes this sensor feedback information for transmission by the RF transceiver 16 to the building computer 14 as packets of data, along a route determined by routing tables which are formulated during the network initialization process of the present invention to be described hereinafter. The building computer 14, based upon sensor feedback information received from the nodes 12, and in accordance with lighting control software which resides therein, generates control data which is transmitted as packets of data to the nodes 12 along a route determined by the routing tables. This control data is then processed by the digital signal processing circuitry 20 of the nodes 12 and supplied to the wall units 18, which in response thereto, produce control signals to adjust the lighting level of their associated ballasts 22, as required. Of course, those skilled in the pertinent art will readily appreciate that the configuration or type of network in which the initialization method of the present invention is utilized is not limiting to the present invention.

Figure 2:
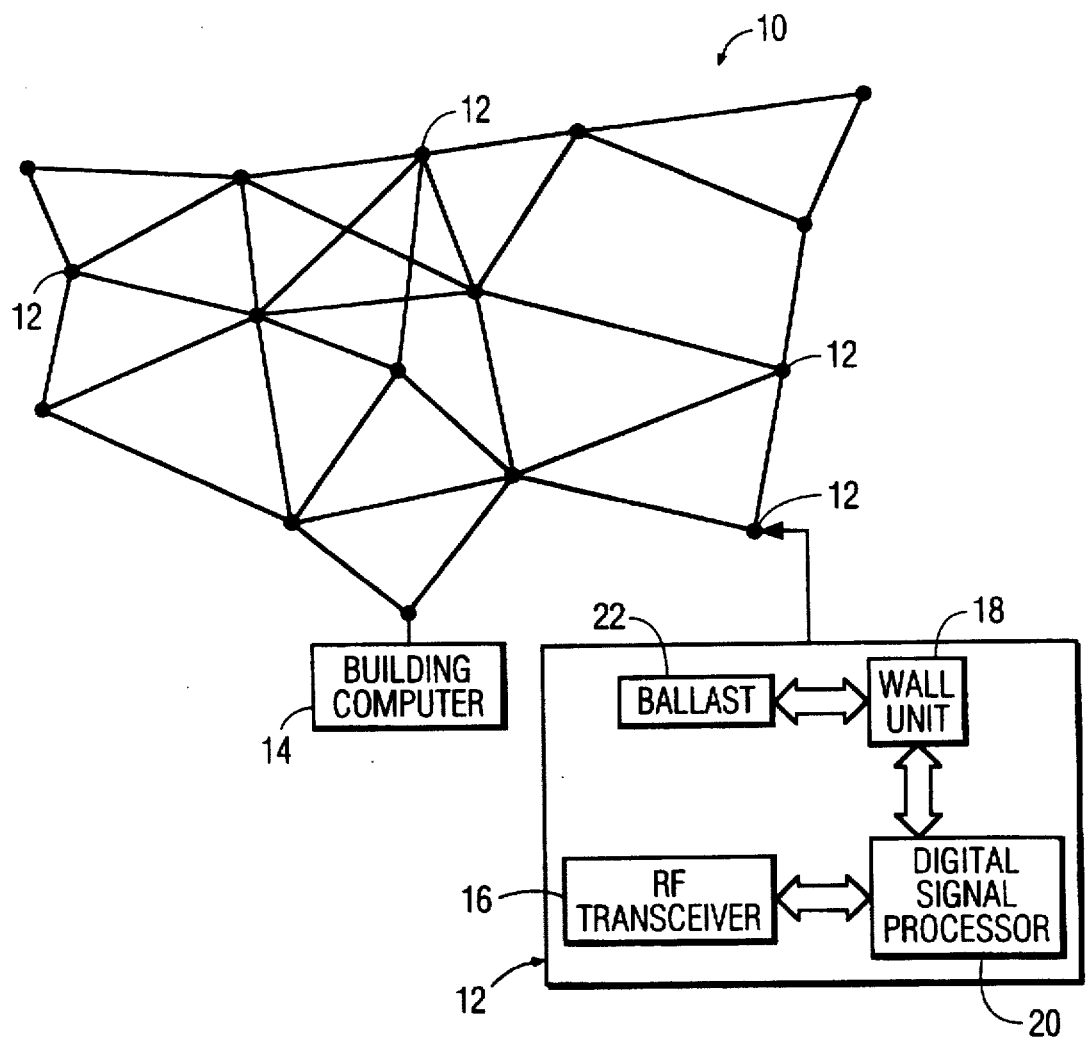

With reference now to FIG. 2, in accordance with the initialization method of the present invention, the building computer 14 transmits an INIT packet to one of the nodes 12 in the network 10 to command that node to initialize. INIT packets use the network just like any other packet and can therefore be used with any desired routing protocol. This command can even be used supplemental to another network initialization routine, such as random initialization, to ensure connectivity. Any node 12 can also be initialized or re-initialized at any time without requiting a complete re-initialization of the entire network. Further, it will be appreciated that one or more of the nodes 12 can be initialized concurrently or in seriatim.

The node which receives the INIT packet responds thereto by transmitting a beacon, i.e., a series of INIT_BEACON packets equally spaced in time, requesting a response from all nodes which receive one or more of these packets. The INIT_BEACON packets are transmitted with a predetermined address (or information segment) that all nodes respond to but never repeat or hop. For example, in a presently contemplated system, each INIT_BEACON packet contains a special byte having a value of $00, where $ is a hexadecimal value.

Each node which receives an INIT_BEACON packet preferably senses the status of the network communication channel prior to responding to an INIT_BEACON which it receives, in accordance with a carrier sense multiple access (CSMA) scheme. According to this scheme, a receiving node waits for a random of period of time, and then senses the channel to determine whether it is available ("clear") or unavailable ("busy") for transmitting a RESPONSE_INIT_BEACON packet in response to the INIT_BEACON packet. If it is detected that the channel is busy, then the receiving node waits for another random delay period before sensing the status of the channel again in a further attempt to transmit a response. This protocol reduces the probability that its transmission will not overrun the transmission of another nearby node. Similarly, the initializing node also senses the channel in accordance with this protocol, and if detects that the channel is busy at the time that a transmission of an INIT_BEACON packet is to occur, then it waits for another beacon cycle prior to re-attempting the transmission. A "full beacon cycle" is the set or prescribed time interval between transmissions of successive INIT_BEACON packets.

The initializing node strips the address of the responding node from each RESPONSE_INIT_BEACON packet which it receives in response to the INIT_BEACON packets it has transmitted, and logs this address in its memory. The intializing node compares the address it strips from each RESPONSE_INIT_BEACON packet it receives with the previous addresses which it has stored in its memory during the initialization process for that node, which is conveniently referred to herein as the "beacon initialization process." Only those addresses which correspond to nodes which have not previously responded to during the beacon initialization process are stored in the memory, so that the memory thus contains the addresses of all nodes which have responded at least once (i.e., have at least sent back one RESPONSE_INIT_BEACON packet) during the beacon intialization process. Further, the intializing node counts the number of RESPONSE_INIT_BEACON packets it receives from each node, and saves the associated values for subsequent transmission back to the building computer 14 as part of the nodal connectivity information.

The beacon initialization process for a given initializing node is completed either when a prescribed number of INIT_BEACON packets have been transmitted, or after a prescribed number of beacon cycles without receiving a response from any additional nodes. Otherwise stated, the beacon initialization process is terminated after the initializing node has not received a response from any node whose first response has not yet been received during the prescribed number of beacon cycles.

The characteristics of the INIT_BEACON and RESPONSE_INIT_BEACON packets ensure that a link between a given pair of nodes is only registered if packets can travel both ways, i.e., only if a two-way link between the nodes is confirmed. This is particularly important for RF links beacuse a different transmitter-receiver pair are used for communication in each direction and each pair can have considerably different communication characteristics.

The problem of unresolvable collisions of the RESPONSE_INIT_BEACON packets remains identical to that which occurs with the random initialization process, as described previously. For example, making reference to the exemplary network depicted in FIG. 1 to illustrate this point, nodes 3 and 6 can collide at node 2 when both respond to an INIT_BEACON packet transmitted by node 2. However, the transmission of a series of INIT_BEACON packets and random delays (in accordance with the CSMA scheme) virtually ensures that not all of the responses (i.e., RESPONSE_INIT_BEACON packets) sent back to node 2 by nodes 3 and 6 will collide during the beacon initialization process. That is, there is a near-zero probability that all of the responses transmitted by nodes 3 and 6 in response to the multiple INIT_BEACON packets will collide. In the random initialization scheme, such a collision of the response packets sent by the nodes 3 and 6 would result in incomplete nodal connectivity information being relayed back to the building computer BC, since node 2 would only transmit a single initialization packet in accordance with this scheme.

With reference again to FIG. 2, in accordance with the present invention, each individual node 12 in the network 10 performs the above-described beacon initialization process. As a result, each node 12 in the network 10 determines its entire connectivity, i.e., its connectivity to every other node 12 in the network 10 within a prescribed range or vicinity therefrom (e.g., every other node within its transmitting range that is able to receive valid or uncorrupted data therefrom), prior to transmitting this nodal connectivity information back to the building computer 14.

This complete nodal connectivity information for each node 12 in the network 14 is important to the formulation of effective routing tables by the building computer 14, which routing tables can then be used by the building computer 14 to transfer packets of data from the building computer 14 to a destination node or from an origin node to the building computer 14 (or other node) by hopping the packets of data from node-to-node along the most efficient possible route, with the lowest miscommunication probability. Further, routes to uninitialized nodes are selected from the nodal connectivity information received from previously initialized nodes. Thus, routing tables are being formulated and tested, utilizing the network routing protocol, simultaneously with the network initialization process. This results in a tested, functional network upon completion of the network initialization process.

An even more serious problem which limits the usefulness of the random initialization scheme and that is resolved by the initialization method of the present invention, is the volume of collisions that occur in the vicinity of the building computer 14 due to the mass of nodal connectivity information which is convergent on the building computer 14, as was discussed hereinbefore. In this connection, the initialization process of the present invention greatly reduces the volume of nodal connectivity information which is convergent on the building computer 14 (by more than one order of magnitude with respect to random initialization), and thus limits the number of collisions which can occur. This benefit is achieved by virtue of the fact that, in accordance with the initialization process of the present invention, each node 12 transmits its entire connectivity information as a packet or set of packets to the building computer 14, thereby significantly reducing data traffic volume. Furthermore, the building computer 14 "expects" to receive a RESPONSE_INIT packet from each node 12 which has been commanded to initialize. Thus, if a collision does occur, that node 12 can be polled by the building computer 14 for its nodal connectivity information, or commanded by the building computer 14 to re-initialize.

Additionally, the initialization process of the present invention includes a "software handshaking" scheme which ensures that the building computer 14 receives all of the nodal connectivity information for each node 12 in the network 10 prior to completion of the overall network initialization process.

According to a presently preferred embodiment of this software handshaking scheme, each node 12 in the network 10, after compiling all of its nodal connectivity information (i.e., after concluding its beacon initialization process), transfers this nodal connectivity information to the building computer 14 as a RESPONSE_INIT packet or set of RESPONSE_INIT packets that each contain a special byte which have a command value indicative of the number of packets which will remain to be received by the building computer 14 after that packet is received by the building computer 14.

For example, if after compiling all of the connectivity information obtained from the REPONSE_INIT_BEACON packets which it receives from the other nodes as a result of the beacon initialization process, a particular node determines that it needs to send four RESPONSE_INIT packets of nodal connectivity information to the building computer 14, a special command value of $A3 could be included in the first packet it sends to the building computer 14 to indicate that the building computer 14 must receive 3 more RESPONSE_INIT packets from that node before all of the connectivity information for that node will have been transferred to the building computer 14.

Continuing with this example, after the building computer 14 receives the first RESPONSE_INIT packet from that node, it requests the second RESPONSE_INIT packet from that node by placing an appropriate command value (e.g., $A1) in a special command byte of the INIT packet. After receiving the second RESPONSE_INIT packet from that node, the building computer 14 requests the third RESPONSE_INIT packet from that node by placing the appropriate command value (e.g., $A2) in the special command byte of a subsequent INIT packet. After receiving the third RESPONSE_INIT packet from that node, the building computer 14 requests the fourth RESPONSE_INIT packet from that node by placing the appropriate command value (e.g., $A3) in the special command byte of a subsequent INIT packet.

If the building computer 14 times-out (i.e., if a prescribed period of time elapses) before receiving any response to the original INIT packet sent to a particular node, it can poll that node, e.g., by placing an appropriate command value (e.g., $A0), or leaving blank, the special command byte in a subsequent INIT packet. This will prompt that node to re-send its nodal connectivity information to the building computer 14. In this regard, initialization of any node can be requested at any time during network operation by a single command, without requiring full propagation of a random packet throughout the network 10, as in the presently available random initialization scheme.

This software handshaking scheme serves two purposes. First, it guarantees that all connectivity information is received by the building computer 14 from all of the nodes 12, and it tests the routes defined by the previous initializations of nodes closer to the building computer 14 now being used to route INIT and RESPONSE_INIT packets between initializing nodes and the building computer 14.

Additionally, the building computer 14 can advantageously initialize multiple nodes simultaneously, since the possibility of a greater number of unresolvable collisions will not result in the loss of any nodal connectivity information because it is guaranteed to receive all of this information by virtue of the above-described polling and software handshaking scheme. Selectively initializing nodes in densely packed areas of the network 10 would enable a further reduction in the time required to complete the network initialization process.

It will be appreciated by those skilled in the art that the network initialization method of the present invention can be implemented in a fully automatic manner, which is virtually transparent to the end-user, e.g., a building manager. Of course, the software for implementing the network initialization method of the present invention is pre-loaded/pre-programmed into the microprocessor (or other digital signal processor device) of each of the nodes 12, and in the building computer 14. In this connection, once the network 10 is installed, the building manager can, with one or a few keystrokes and/or mouse clicks, command network initialization. After this command is given, the network 10 will automatically initialize itself in accordance with the method of the present invention, without any intervention of the building manager, and without requiring any costly expert assistance from the network vendor. Thus, the automatic network initialization method of the present invention overcomes another significant disadvantage of the presently available random initialization method.

Although a presently preferred embodiment of the present invention has been described in detail hereinabove, it should be clearly understood that many variations and/or modifications of the basic inventive concepts herein taught which may appear to those skilled in the pertinent art will still fall within the spirit and scope of the present invention as defined in the appended claims.

What is claimed is:

1. A method for initializing a wireless network which includes a central node and a plurality of individual nodes, comprising the steps of:

issuing an initialization request to each individual node; and, wherein, in response to said initialization request, each individual node performs a self-initialization routine which includes the steps of determining its entire connectivity wherein all nodes in communication with said individual node are identified, compiling corresponding nodal connectivity information, and then, after compiling said nodal connectivity information, transmitting said nodal connectivity information to the central node.

2. The method as set forth in claim 1, further comprising the step of formulating routing tables based on said nodal connectivity information, wherein packets of data can be transferred from an origin node to a destination node by hopping said packets from node-to-node along a route determined on the basis of said routing tables.

3. The method as set forth in claim 2, wherein routes to uninitialized nodes are selected from said nodal connectivity information received from previously initialized nodes, whereby said routing tables are being formulated and tested simultaneously with the network initialization process, thereby resulting in a tested, functional network upon completion of the network initialization process.

4. The method as set forth in claim 1, wherein each individual node, during its self-initialization routine, performs the step of determining its entire connectivity by determining its connectivity to every other node within a prescribed range therefrom.

5. The method as set forth in claim 4, wherein the central node performs the step of issuing an initialization request by transmitting an initialization packet to each individual node.

6. The method as set forth in claim 1, wherein each individual node performs the step of determining its connectivity during its self-initialization routine by:

transmitting a series of beacon initialization packets requesting a response from all nodes which receive one or more of said beacon initialization packets, wherein each receiving node transmits a response beacon initialization packet which contains its address;

extracting the address of said receiving node from each response beacon initialization packet received from the other nodes and keeping a record of these receiving node addresses; and, counting the number of response beacon initialization packets received from each said receiving node.

7. The method as set forth in claim 6, wherein said self-initialization routine for each individual node is completed after a prescribed number of beacon initialization packets have been transmitted.

8. The method as set forth in claim 6, wherein said self-initialization routine for each individual node is completed after a prescribed number of beacon initialization packets have been transmitted without receiving a response from any node which has not previously responded.

9. The method as set forth in claim 6, wherein routes to uninitialized nodes are selected from said nodal connectivity information received from previously initialized nodes.

10. The method as set forth in claim 6, wherein each node which receives a beacon initialization packet from an other one of said nodes waits for a random delay period and then senses the status of a communication channel between that node and said other one of said nodes prior to making an attempt to transmit said response beacon initialization packet in response to said beacon initialization packet, in accordance with a carrier sense multiple access protocol.

11. The method as set forth in claim 10, wherein, in accordance with said carrier sense multiple access protocol, each said node which receives a beacon initialization packet from an other one of said nodes, if it senses that said communication channel is busy, waits for another random delay period, and then again senses the status of said communication channel, prior to making another attempt to transmit a response beacon initialization packet.

12. The method as set forth in claim 11, wherein each individual node, during its self-initialization routine, waits for a random delay period and then senses the status of said communication channel, prior to making an attempt to transmit a beacon initialization packet, in accordance with said carrier sense multiple access protocol.

13. The method as set forth in claim 12, wherein each individual node, during its self-initialization routine, if it senses that said communication channel is busy, waits for a full beacon cycle, and then again senses the status of said communication channel, prior to making another attempt to transmit a beacon initialization packet.

14. The method as set forth in claim 1, wherein each individual node performs the step of transmitting its nodal connectivity information during its self-initialization routine by transmitting a set of initialization response packets to the central node, each of said initialization response packets including a prescribed byte having a value which is indicative of the remaining number of initialization response packets in that set.

15. The method as set forth in claim 14, wherein the step of issuing an initialization request is performed by the central node transmitting a first initialization packet, and then transmitting additional initialization packets to each individual node on the basis of the number of initialization response packets remaining in the set of initialization response packets for that node as determined on the basis of the value of said prescribed byte in previously received initialization response packets from that node, until all of said initialization response packets from each node have been received.

16. The method as set forth in claim 15, wherein the central node polls any specific node from which it has not received a first initialization response packet during a prescribed period of time, by transmitting a further initialization packet to request that specific node to re-transmit its set of initialization response packets.

17. The method as set forth in claim 1, further comprising the step of performing a handshaking routine to ensure that all of said nodal connectivity information compiled by each of said nodes is received by the central node.

18. The method as set forth in claim 1, wherein the step of issuing an initialization request is performed by the central node transmitting a sequence of initialization packets to respective ones of the nodes.

19. The method as set forth in claim 1, wherein the step of issuing an initialization request is performed by the central node transmitting a plurality of initialization packets to respective ones of the nodes simultaneously.

20. The method as set forth in claim 1, wherein the central node comprises a building computer and the wireless network comprises a building system control network.

21. A wireless network, comprising:
- a central node which includes an RF transceiver and digital signal processing circuitry programmed to execute a network initialization routine;
- a plurality of individual nodes each of which includes an RF transceiver and digital signal processing circuitry programmed to execute a self-initialization routine;
- wherein said central node initiates said network initialization routine by issuing an initialization request to each of said individual nodes;
- wherein each of said individual nodes executes its self-initialization routine by determining its connectivity to every other individual node within a prescribed range therefrom wherein all nodes in communication with said individual node which are within the prescribed range are identified, compiling corresponding nodal connectivity information, and then, after compiling said nodal connectivity information, transmitting said nodal connectivity information to said central node.

22. The wireless network as set forth in claim 21, wherein said central node and individual nodes are programmed to execute a handshaking routine which ensures that all of said nodal connectivity information compiled by each of said individual nodes is received by said central node.

23. The wireless network as set forth in claim 21, wherein said central node comprises a building computer and the wireless network comprises a building system control network.

24. The wireless network as set forth in claim 23, wherein said building system control network comprises an intelligent lighting control system.

25. The wireless network as set forth in claim 21, wherein each individual node determines its connectivity when executing its self-initialization routine by means of:
- transmitting a series of beacon initialization packets requesting a response from all nodes which receive one or more of said beacon initialization packets, wherein each receiving node transmits a response beacon initialization packet which contains its address;
- extracting the address of said receiving node from each response beacon initialization packet received from the other nodes and keeping a record of these receiving node addresses; and,
- counting the number of response beacon initialization packets received from each said receiving node.

* * * * *